(No Model.) 2 Sheets—Sheet 1.
C. W. HUNT.
CABLE RAILWAY.
No. 522,713. Patented July 10, 1894.
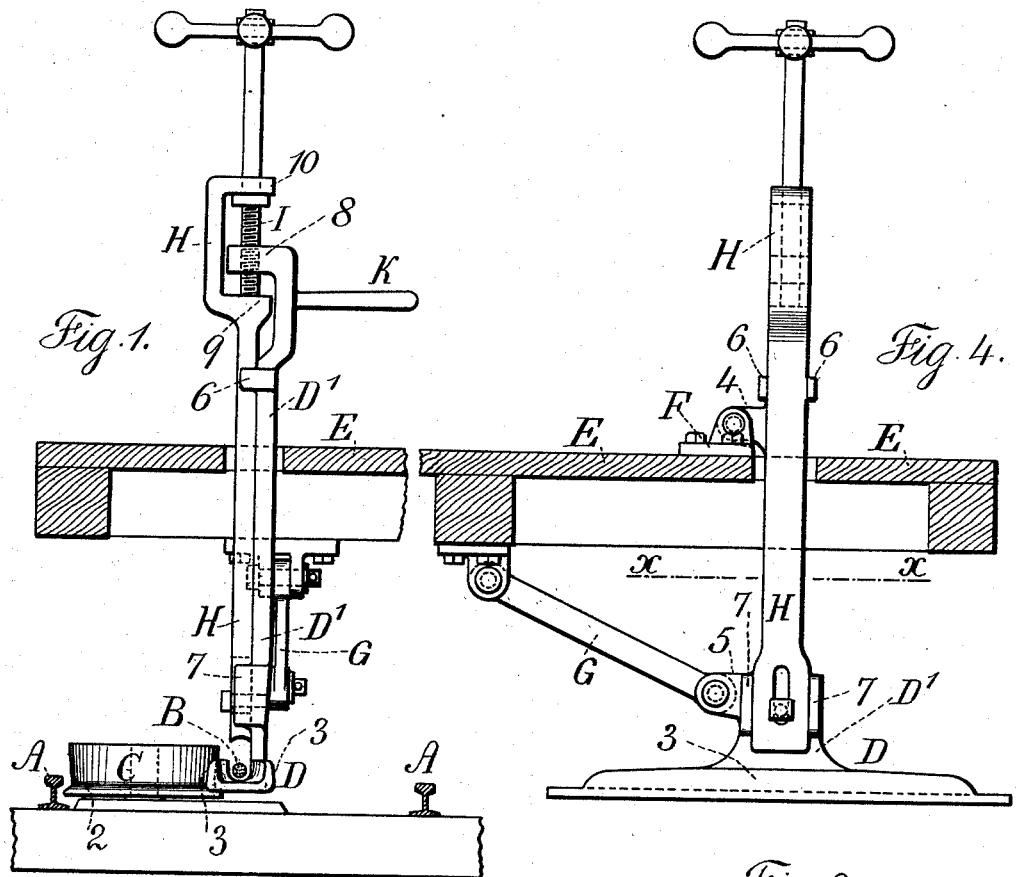
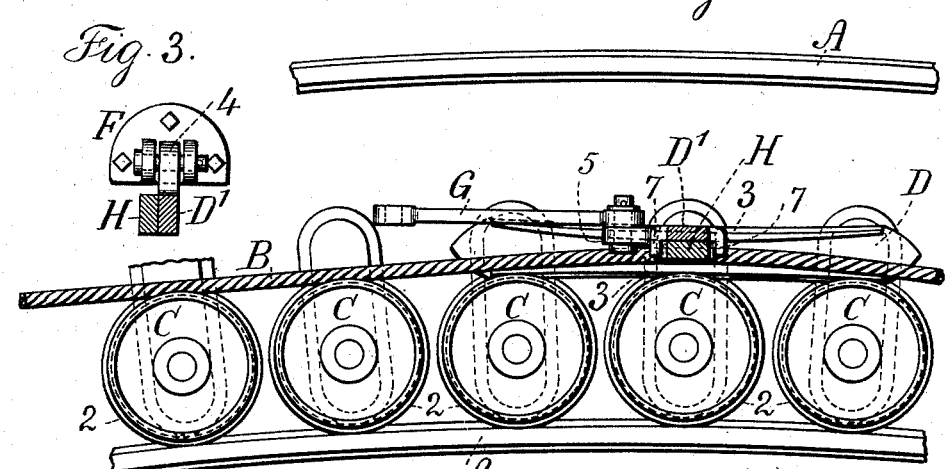
Witnesses:
J. Staib
Chas. H. Smith
Inventor:
C. W. Hunt
per Lemuel W. Serrell
Atty.

(No Model.) 2 Sheets—Sheet 2.
C. W. HUNT.
CABLE RAILWAY.
No. 522,713. Patented July 10, 1894.
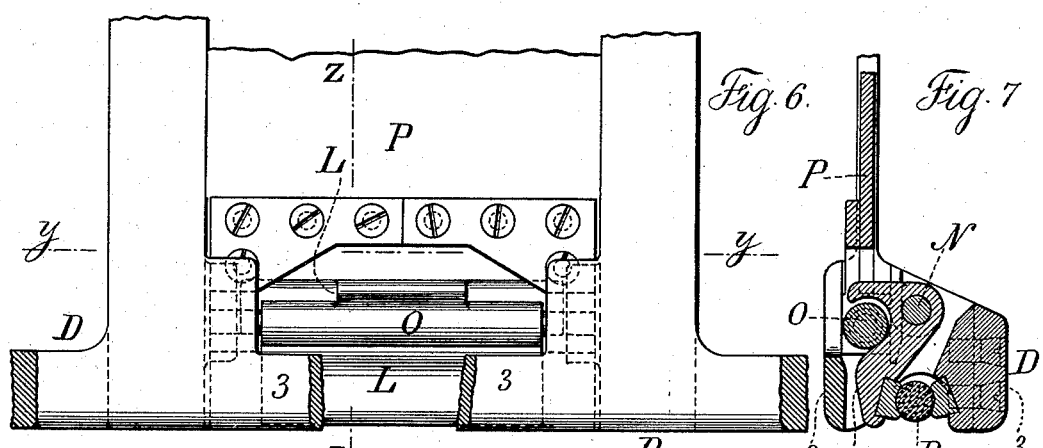
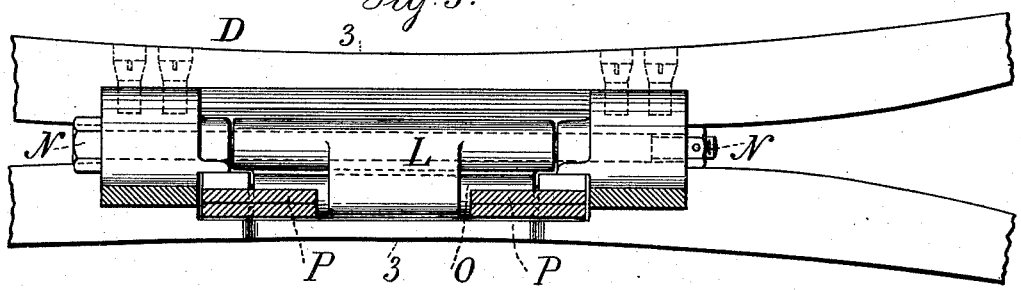
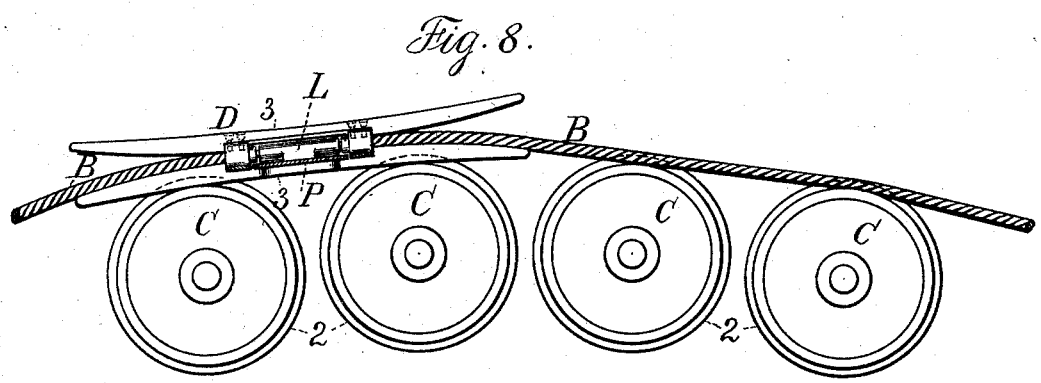
Witnesses:
J. Staib
Chas. H. Smith
Inventor:
C. W. Hunt
per Lemuel W. Serrell
Atty.

UNITED STATES PATENT OFFICE.

CHARLES W. HUNT, OF WEST NEW BRIGHTON, NEW YORK.

CABLE RAILWAY.

SPECIFICATION forming part of Letters Patent No. 522,713, dated July 10, 1894.

Application filed April 27, 1894. Serial No. 509,240. (No model.)

*To all whom it may concern:*

Be it known that I, CHARLES W. HUNT, a citizen of the United States, residing at West New Brighton, in the county of Richmond and State of New York, have invented an Improvement in Cable Railways, of which the following is a specification.

This improvement is adapted to street railways and passenger cars and also to industrial railways such as those employed in mines and manufactories where cars are used for transporting ore, coal or other materials from one place to another.

In cable railways a bearing rail is usually provided to take the lateral strain of the grip holding the cable in passing around a curve, and the cable receives short bends at the ends of the grip when such cable enters or leaves a curve and is thereby injured.

By my present improvements I arrange the rollers around which the cable passes in turning curves as close together as convenient according to the size of the rollers or wheels, and upon the car a grip is connected, the exterior surface of which is adapted at either side to run upon the cable rollers, so that the grip shoe intervenes between the cable and the cable rollers and is sufficiently long to extend from one to the other, so as always to be bearing upon two or more of the rollers, and the grip shoe is so constructed that the cable does not receive any short bends, and the cable can run through the grip even on a curve with but little wear on the cable, because the inner surfaces of the grip are given originally the same shape that would be the result of the cable wearing the grip surfaces to the proper shape.

By this improvement the car can be drawn from one place to another and pass around the curves in either direction without risk of injury either to the car or to the cable or the grip mechanism, and the special guard rail to take the lateral strain in passing around curves, as usually provided, is dispensed with, and the short bends in the cable at the ends of the grip when passing curves, are prevented.

In the drawings, Figure 1 is an elevation of the grip mechanism, a portion of the frame of the car being in section and showing also the track in section. Fig. 2 is a plan view of the grip shoe below the line $x\ x$, Fig. 4, and showing some of the rollers upon the track. Fig. 3 is a plan view of the upper support for the grip mechanism. Fig. 4 is an elevation at right angles to Fig. 1. Fig. 5 is a sectional plan below the line $y\ y$ Fig. 6, of the improvement as applied to a passenger car grip. Fig. 6 is an elevation of the same partially broken open. Fig. 7 is a vertical cross section at $z\ z$, Fig. 6, and Fig. 8 is a plan view in smaller size of the grip, cable, and some of the rollers around which the cable passes at a curve.

The rails A are to be at a suitable distance apart and the cable B is between the rails, and where curves occur in the track, the rollers C are provided and they are placed close together all around the curve. Each roller C is preferably made with an inclined bottom flange 2 above which the cable B is sustained, and the upper portion of the roller is slightly conical so as to insure the passage of the cable downwardly until it rests upon the flange 2. In Figs. 1 and 2 the rollers are shown as above the track. With passenger cars and in cities the rollers will usually be in a conduit below the track.

The grip shoe D is adapted to the reception of the cable; the outer edges 3 of the grip shoe are not parallel but they are upon arcs of circles of the same radius or nearly so as the curve of the cable where it passes in contact with the numerous rollers C, so that the outer sides 3 of the grip shoe are adapted to bear against the exterior surfaces of the rollers C as the grip shoe is carried by the cable around the curve of the track, and the center portions of the grip shoe are preferably thicker to furnish the necessary strength, but at the same time not to remove the cable an unnecessary distance from the rollers C in passing around curves in the track; and the outer surfaces of the grip shoe are both curved in the same manner so as to be adapted to pass around a curve either to the right or to the left.

The grip shoe D is shown in Figs. 1, 2 and 4 as provided with a vertical stem D′, preferably integral with the shoe and extending up from the center part of one of the flanges, and this stem D′ is represented as passing through a mortise in the frame E of the car, and there is an arm 4 extending out at one side from the stem D' and received by a jaw or plate F upon the surface of the car frame, and it is advantageous to have the connection between the arm 4 and the jaw or plate F sufficiently loose to allow the stem D' and grip shoe to swing and accommodate themselves to variations in the track or in the rollers around which the cable passes, and I have shown a pin passing through the jaw or plate and through the arm 4 for connecting such arm to the jaw plate. At the lower part of the stem D' or near the grip shoe an ear or lug 5 passes off and receives the brace G to which it is connected by a suitable joint, or pivot, and this brace G passes diagonally up to the under side of the car frame where it is attached preferably by a jaw and pin, so that the power that may be applied by the cable to the grip shoe is transferred to the car for pulling or pushing the same without any tendency to bend the stem of the grip shoe.

Any suitable mechanism may be made use of for clamping the cable in the grip; I have however shown in Figs. 1, 2 and 4, the clamp bar H setting against one side of the vertical stem D' and guided in its vertical movement by the flanges 6 and 7, and the screw I is adapted to force the clamp bar down upon the cable as it lies in the grip shoe, or to relieve the clamping action. This screw I preferably passes through a nut 8 upon the upper part of the stem D' at one side thereof so as to act upon a shoulder 9 at the upper part of the clamp bar H, and by passing the screw I through a flange 10 at the top end of the clamp bar the parts are held in their proper relative positions and the screw is direct acting upon the shoulder 9 in clamping the cable; and it is advantageous to provide a handle K at the upper end of the stem D' for steadying the same either by the hand or by the foot of the attendant while applying the screw I to clamp the cable or in unscrewing the clamp to relieve the cable.

Under any circumstances the cable is free to draw in a straight line through the grip when the car is on a straight track or to draw against either of the inner sides of the grip while the exterior edge of the grip shoe is in contact with the rollers around which the cable passes in turning a curve, and the inner surfaces of the grip are curved and of the same shape that such surfaces would have if the cable were allowed to run through the shoe while remaining stationary on a curved track until such surfaces were worn down to shape by the friction of the cable, hence such cable does not receive any short bends and is not injured by contact with the surfaces.

The cable B, shown in Figs. 1 and 2, has to be picked up into the shoe because the same is trough-shaped, but in grips that are adapted to be depressed and seize the cable from above and at opposite sides thereof, as shown in Figs. 5 to 8, the grip is open at the bottom so that the cable can be dropped by opening the jaws.

I have shown a known form of gripping device in which the jaw L is swung on its pivots N in grasping or releasing the cable, such jaw being acted upon by the roller O upon the vertically movable plate P that passes up between the slot rails to the car. In grips of this general character the outer and nearly vertical surfaces are curved horizontally to correspond to the curve of the cable as it passes along against the groups of rollers in traversing a curve, so that the surfaces of the grip travel in direct contact with such rollers, and separate rollers and guard or bearing rails are dispensed with.

I claim as my invention—

1. The combination with the cable and rollers in close proximity and around which the cable passes in turning a curve, of a grip wider at the ends than in the middle and having inner curved sides between which the cable is received, and exterior curved surfaces adapted to rest against the rollers around which the cable passes in turning a curve, and mechanism for clamping the cable within the grip, substantially as set forth.

2. The combination with the grip shoe having sides that are nearer together at the middle than at the ends and between which the cable is received, and a stem extending vertically from the grip shoe, of a clamp bar adjacent to the stem of the grip shoe, means for holding the clamp bar to the stem, and a screw for acting upon the bar to move the same in clamping the cable, substantially as set forth.

3. The combination with the grip shoe and its stem, of a brace connected with the stem near the grip shoe, the car frame with which the other end of the brace is connected, a clamp bar adjacent to and connected with the stem of the grip shoe, a screw acting between the clamp bar and the stem of the grip shoe in clamping or releasing the cable, and a connection between the frame of the car and the stem of the grip shoe, substantially as set forth.

4. The combination with the grip shoe and its stem, of a brace connected with the stem near the grip shoe, the car frame with which the other end of the brace is connected, a clamp bar adjacent to and connected with the stem of the grip shoe, a screw acting between the clamp bar and the stem of the grip shoe in clamping or releasing the cable, a connection between the frame of the car and the stem of the grip shoe, and a handle upon the stem of the grip shoe, substantially as set forth.

5. The grip shoe having side flanges between which the cable is received and wider near the ends than at the middle, so as to be adapted to run against the cable rollers upon the track, a stem connected with the grip shoe and extending upwardly, in combination with the car frame, a brace between the car frame and the lower portion of the grip shoe stem and a connection between such car frame and the grip shoe stem near the upper portion thereof, a screw passing through a nut upon the grip shoe stem, a clamp bar having a flange at the upper end through which the screw passes, and a shoulder for the end of the screw to act against, means for holding the clamp bar to the grip shoe stem and for allowing an end movement to the clamp bar when the end thereof is pressed upon the cable or withdrawn from the same, substantially as set forth.

Signed by me this 25th day of April, 1894.

CHAS. W. HUNT.

Witnesses:
CHARLES C. KING,
JOHN McW. SHEPHERD.